United States Patent
Benesch et al.

(10) Patent No.: US 11,128,237 B2
(45) Date of Patent: Sep. 21, 2021

(54) ELECTRICALLY COUPLING A FIRST ELECTRICAL SUPPLY NETWORK TO A SECOND ELECTRICAL SUPPLY NETWORK

(71) Applicant: Siemens Aktiengesellschaft, Munich (DE)

(72) Inventors: Norbert Benesch, Heroldsberg (DE); Harald Wiessmann, Erlangen (DE); Franz Bauer, Herzogenaurach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/058,583

(22) PCT Filed: May 15, 2019

(86) PCT No.: PCT/EP2019/062507
§ 371 (c)(1),
(2) Date: Nov. 24, 2020

(87) PCT Pub. No.: WO2019/228816
PCT Pub. Date: Dec. 5, 2019

(65) Prior Publication Data
US 2021/0203251 A1 Jul. 1, 2021

(30) Foreign Application Priority Data
May 30, 2018 (EP) .................................... 18174998

(51) Int. Cl.
*H02M 7/5387* (2007.01)
*H02M 1/32* (2007.01)

(52) U.S. Cl.
CPC .. *H02M 7/53875* (2013.01); *H02M 2001/325* (2013.01)

(58) Field of Classification Search
CPC ............... H02M 1/32; H02M 7/53875; H02M 2001/325; H02P 21/22; H02P 7/5387
See application file for complete search history.

(56) References Cited

U.S. PATENT DOCUMENTS

| 7,400,102 B2 | 7/2008 | Hobraiche et al. |
| 2002/0196645 A1* | 12/2002 | Oba ................. H02M 7/53873 363/97 |

(Continued)

FOREIGN PATENT DOCUMENTS

| CN | 105552982 A | 5/2016 |
| CN | 106877501 A | 6/2017 |

(Continued)

OTHER PUBLICATIONS

PCT International Search Report and Written Opinion of International Searching Authority dated Jul. 8, 2019 corresponding to PCT International Application No. PCT/EP2019/062507 filed May 15, 2019.

(Continued)

*Primary Examiner* — Adolf D Berhane
(74) *Attorney, Agent, or Firm* — Henry M. Feiereisen LLC

(57) ABSTRACT

In a method for operating an energy converter that couples a first supply network to a second supply network by converting electrical energy via a switch element, the switch element is operated in a switching operation and a supply-network current for one of the supply networks is adjusted depending on a comparison of the supply-network current with a reference current. In a first operating mode for the switching operation, an electrical voltage of one of the supply networks is set by a PWM method on the basis of the comparison, and a second operating mode is provided, in which the switch element is switched when, during the comparison, a difference between the supply-network cur- (Continued)

rent and the reference current is greater than a first predefined relative switching value and/or is smaller than a second predefined relative switching value, wherein the first and second operating modes are alternated during the operation.

20 Claims, 5 Drawing Sheets

(56) References Cited

U.S. PATENT DOCUMENTS

| | | | |
|---|---|---|---|
| 2009/0160377 A1* | 6/2009 | Yamada | H02M 7/53871 318/400.02 |
| 2017/0149370 A1 | 5/2017 | Pruessmeier et al. | |
| 2019/0089285 A1* | 3/2019 | Otsuka | H02P 27/045 |
| 2019/0260309 A1 | 8/2019 | Wiessmann et al. | |

FOREIGN PATENT DOCUMENTS

| | | |
|---|---|---|
| EP | 2 182 625 A1 | 5/2010 |
| EP | 3 171 501 A2 | 5/2017 |
| EP | 3 297 150 A1 | 3/2018 |
| EP | 3 300 242 A1 | 3/2018 |

OTHER PUBLICATIONS

Benesch, Norbert et al: "Grid-side control of inverters for power generation in microgrids"; 2014 4th International Electric Drives Production Conference (EDPC), IEEE, Sep. 30, 2014 (Sep. 30, 2014), pp. 1-6, XP032704503.

* cited by examiner

ELECTRICALLY COUPLING A FIRST ELECTRICAL SUPPLY NETWORK TO A SECOND ELECTRICAL SUPPLY NETWORK

CROSS-REFERENCES TO RELATED APPLICATIONS

This application is the U.S. National Stage of International Application No. PCT/EP2019/062507, filed May 15, 2019, which designated the United States and has been published as International Publication No. WO 2019/228816 A1 and which claims the priority of European Patent Application, Serial No. 18174998.7, filed May 30, 2018, pursuant to 35 U.S.C. 119(a)-(d).

BACKGROUND OF THE INVENTION

The invention relates to an energy converter for electrically coupling a first electrical supply network to a second electrical supply network with at least one switch element and a control unit, which is electrically coupled to the at least one switch element and embodied to operate the at least one switch element in a switching operation such that the energy converter provides a predefinable energy conversion functionality, and wherein the control unit is embodied to set a supply-network current for one of the supply networks in dependence on a comparison of the supply-network current with a predefinable comparison current. The invention furthermore relates to an energy converter system for electrically coupling a first electrical supply network to a second electrical supply network, with at least two energy converters each of which can be connected to the first electrical supply network and to the second electrical supply network. The invention further relates to a method for operating an energy converter, which electrically couples a first electrical supply network to a second electrical supply network in that the energy converter converts electrical energy by means of at least one switch element, wherein the at least one switch element is operated in a switching operation such that the energy converter provides a predefined energy conversion functionality and a supply-network current for one of the supply networks is set in dependence on a comparison of the supply-network current with a predefined comparison current. Furthermore, the invention relates to a method for operating an energy converter system with which a first electrical supply network is electrically coupled to a second electrical supply network by means of at least two energy converters each of which is connected to the first electrical supply network and to the second electrical supply network.

Energy converters, energy converter systems with a plurality of energy converters and methods for the operation thereof are extensively known in the prior art so no separate printed evidence of this is required. An energy converter is an electrical device that is used to electrically couple the first and the second electrical supply network to one another in predefinable manner so that energy can be exchanged between the first and the second electrical supply network. The first or second electrical supply network can, for example, be a DC voltage supply network or also an AC voltage supply network, in particular a polyphase AC voltage supply network. Depending on the nature of the electrical supply network, the energy converter is embodied as a rectifier, an inverter, a DC/DC converter or the like.

Nowadays, energy converters are used in the form of so-called static energy converters, which means that, unlike dynamic energy converters, they do not comprise any mechanically movable, in particular rotatable, parts for the purpose of energy conversion. As a rule, static energy converters are embodied as clocked electrical energy converters and, for this purpose, comprise at least one converter inductor and at least one switch element that are suitably interconnected and, for example, connected to the first and the second connector via which the energy converter is connected to the first and the second electrical supply network so that the operation of the switch element in a suitable switching operation enables the desired conversion function of the energy converter to be achieved.

Herein, a switch element in the sense of this disclosure is preferably a controllable electronic switch element, for example a controllable electronic semiconductor switch such as a transistor, a thyristor, combination circuits thereof, preferably with parallel-connected freewheeling diodes, a gate turn-off thyristor (GTO), an isolated gate bipolar transistor (IGBT), combinations thereof or the like. Basically, the switch element can also be formed by a field effect transistor, in particular a metal oxide semiconductor field effect transistor (MOSFET).

To provide the desired energy conversion functionality, the at least one switch element is operated in a switching operation. With regard to a semiconductor switch in the style of a transistor, this means that, when the switching state is switched on, a very low electrical resistance is provided between the connectors of the transistor that form a contact gap thus enabling a high current flow with a very low residual voltage. On the other hand, when the switching state is switched off, the transistor contact gap has high resistance, i.e. it provides a high electrical resistance so that substantially no current flow or only a very small, in particular negligible, current flow is present even when a high electrical voltage is applied to the contact gap. This differs from linear operation with transistors but is not, as a rule, used with clocked energy converters.

The first and also the second connector are embodied according to the electrical supply network to be connected in each case to enable coupling as intended to be achieved. Thus, it can be provided that, in a direct-voltage supply network or a single-phase AC voltage supply network, the corresponding connector of the energy converter comprises at least two connector poles in order to enable the connection of the at least two electrical potentials of this electrical supply network. On the other hand, in a polyphase AC voltage supply network a plurality of connector poles can be provided accordingly thus enabling the respective phases of the polyphase AC voltage supply network to be connected as intended. The circuit structure of the energy converter, which, depending on requirements, can also comprise two or even more converter inductors that are preferably not magnetically coupled to one another, is embodied accordingly. Accordingly, it is also possible for two or more switch elements to be provided that are electrically coupled by means of respective converter inductors in order to be able to provide the desired energy conversion functionality.

The at least one switch element is coupled to the control unit. In the case of a plurality of switch elements, preferably all of the plurality of switch elements are coupled to the control unit. The coupling is preferably embodied such that each of the switch elements can be controlled individually. The control unit can be embodied as an electronic circuit that provides corresponding control signals for the at least one switch element thus enabling the desired switching operation of the switch element to be implemented. In addition to electronic components, for the predefinable provision of the control signals, the electronic circuit can also include at least one program-controlled computing unit in order to be able to provide the desired function of the control unit. The control unit can, of course, also consist exclusively of the computer unit.

The control unit is embodied to operate the at least one switch element in switching operation such that the energy converter provides the predefinable energy conversion functionality between the first and the second connector. The control unit is further embodied to set a supply-network current at one of the connectors in dependence on a comparison of the supply-network current with a predefinable comparison current. Therefore, the control unit provides a regulating functionality by means of which the supply-network current can be set in a predefinable manner. This enables the supply-network current to be regulated in a predefinable manner at the connector at which it is detected. The supply-network current can, for example, be detected by a suitable current sensor the like. The current sensor can be included in the energy converter. However, it can also be provided that the energy converter comprises a connector for the current sensor, which is, for example, included in the corresponding electrical supply network to which the regulated supply-network current is to be applied.

Energy converter systems are also used extensively. Energy converter systems comprise at least two energy converters, which are operated together in a suitable manner so that the energy converter system, which is also used to couple two electrical supply networks to one another electrically, is able to provide a desired energy conversion functionality. Herein, it is generally provided that the energy converters can be operated in parallel operation. The energy converters can be embodied as explained above.

To regulate the supply-network current, it is common to provide a suitable regulating functionality. For this purpose, the control unit can provide suitable algorithms or even switching patterns for the at least one switch element.

The energy converters, the energy converter systems and also the methods for the operation thereof have basically proven their worth in practical operation. Nevertheless, especially with dynamic processes, for example in the event of disturbances in one or both the electrical supply networks and also on the activation or deactivation one of the at least two energy converters in an energy converter system, problems occur that impair, if not even disrupt, the entire functionality. Therefore, with energy converter systems it is now common for the energy converters connected in parallel to be galvanically decoupled by isolating transformers. This is intended to avoid the occurrence of unwanted cyclic currents in the event of dynamic processes, such as the activation or deactivation of a single one of the energy converters.

In addition, EP 3 297 150 A1 discloses the regulation of phase currents of inverters connected in parallel.

However, it also possible to further improve the operation of a single inverter. Depending upon the method used to regulate the current, there may, for example, be limitations with regard to the dynamics of the regulation, the robustness of the regulation, unfavorable supply network perturbations and high switching losses.

Therefore, the invention is based on the object of improving the operation of energy converters and energy converter systems and disclosing corresponding methods for the operation thereof.

SUMMARY OF THE INVENTION

As a solution, the invention proposes an energy converter, an energy converter system, a method for operating an energy converter and a method for operating an energy converter system as claimed in the independent claims.

Advantageous developments may be derived from features of the dependent claims.

With respect to a generic energy converter, it is in particular proposed that the control unit is embodied to provide a first operating mode for the switching operation for setting an electrical voltage at the one of the supply networks by means of a PWM method in dependence on the comparison and to provide a second operating mode for the switching operation in which the at least one switch element is switched if, during the comparison, a difference between the supply-network current and the predefinable comparison current is greater than a first predefinable relative switching value and/or smaller than a second predefinable relative switching value.

With respect to a generic method for operating the energy converter, it is in particular proposed that a first operating mode for the switching operation is provided in which an electrical voltage is set on the one of the supply networks by means of a PWM method in dependence on the comparison and a second operating mode is provided in which the switch element is switched if, during the comparison, a difference between the supply-network current and the predefined comparison current is greater than a first predefined relative switching value and/or smaller than a second predefined relative switching value.

With respect to a generic energy converter system, it is in particular proposed that the energy converter be embodied according to the invention.

With respect to a generic method for operating an energy converter system, it is in particular proposed that the energy converter be operated according to an inventive method.

The invention is based on the concept that the operation of the energy converter or the energy converter system can be adapted in a desired manner by a suitable selection of operating mode in order to improve the entire functionality even with dynamic processes with respect to the electrical supply networks or also with respect to the activation or deactivation of one of the plurality of energy converters in the energy converter system. Herein, the invention exploits the knowledge that the two operating modes allow the energy converter to be operated with different preferred properties. It is possible to change between the two operating modes as required. This makes it possible to reduce the aforementioned drawbacks of the prior art if not completely overcome them.

The energy converter preferably comprises a first connector to be connected to the first electrical supply network, a second connector to be connected to the second electrical supply network and at least one converter inductor, wherein the at least one switch element is electrically coupled to the at least one converter inductor, wherein the first and the second connector are electrically coupled to one another via the at least one converter inductor and the at least one switch element.

According to the invention, the first operating mode provides the use of a PWM method. Here, this abbreviation stands for pulse width modulation. The PWM method can be used to regulate the supply-network current of the energy converter. It can also be called an indirect current regulating method. In the PWM method, a current regulating functionality is provided, preferably using a PI regulator, in that a supply voltage or output voltage required for the desired supply-network current is calculated and then provided by means of the PWM method. Therefore, in this method, the current is not regulated directly but with the mediation of the supply voltage or the output voltage.

The second operating mode relates to a direct regulating method. The direct regulating method is used to detect and evaluate the present supply-network current, for example in that a so-called actual current is determined, which can then be directly compared with a predefinable target current or the comparison current. This comparison can then be used as the basis for determining and setting a respective switching state of the at least one switch element.

Since the energy converter is operated in clocked operation, both methods regularly reveal deviations from the comparison current. With the first operating mode, it is attempted to achieve the desired supply-network current by suitable correction of the supply voltage. On the other hand, with the second operating mode, it is provided that the at least one switch element is switched if, during the comparison, a difference between the detected supply-network current and the predefinable comparison current is greater than a first predefinable switching value and/or smaller than a second predefinable switching value. Preferably, both the first and the second predefinable switching value are present. They can be of the same order of magnitude. In addition, the first predefinable switching value is preferably greater than the second predefinable switching value when both switching values are present. The switching values can preferably define a distance to the comparison current. They are in particular relative values relating to the comparison current. For example, the switching values can differ from an absolute value with respect to the comparison value. As a result, in the second operating mode, it is possible to set a so-called ripple current with respect to its amplitude. In this first operating mode, this is not possible so that, in this case, the ripple current can be correspondingly greater. However, it should be noted that as a rule it is possible to achieve lower switching losses in the first operating mode than in the second operating mode. This should be noted for the configuration of the energy converter and operation as intended.

Hence, both operating modes have their individual advantages and disadvantages. Hence the PWM method according to the first operating mode can achieve low switching losses, low overall distortive power, inexpensive filter functions and also an inexpensive common-mode filter concept. On the other hand, the second operating mode allows high dynamics and robustness with respect to current regulation, and, in particular in the case of energy converter systems, an almost independent operating option for the individual energy converters, for example in that different comparison currents can be defined as target values for the energy converter.

Therefore, the characteristic difference between the first and the second operating mode in particular consists in the manner in which switching actions or the switching operation of the at least one switch element are determined or executed. The first operating mode is basically a target value for the supply voltage, which was, for example, determined previously by means of an in particular digital current regulator. Hence, using a computing specification, a PWM modulator can be used to determine the corresponding switching actions for a predefined switching period in advance, for example using tables, computing specifications or the like. The desired supply voltage can then be derived from a time average of individual voltages switched in stages over a clock period of the pulse width modulation. The staged voltage profile established thereby then allows the supply-network current to be approximated to the comparison current, wherein, however, a corresponding ripple current is superimposed, but, as a rule, this can be smoothed using suitable filtering measures.

Since the switching actions are described in advance and thus are not able to react directly to the instantaneously detected supply-network current or actual current value, the ripple current can be significantly dependent on an operating point and possibly also on disturbance variables, for example a phase angle in the case of AC voltage, a supply-network voltage, an electromotive force of an electrical machine and/or the like. In addition, the ripple current can also be heavily time-dependent.

On the other hand, with the second operating mode, the comparison current is used directly as the current-target value. Knowledge of the supply voltage is not absolutely necessary for this functional principle. Herein, a switching action preferably also takes place when a deviation of the detected supply-network current or the actual current value from the comparison current is too great. In addition, this operating mode means that switching actions to take place in the future do not have to be established in advance. Namely, the second operating mode allows a direct reaction to changes to the detected supply-network current with respect to the comparison current, as a result of which the ripple current can adopt a profile that is almost identical to the first operating mode and hence does not really need to be dependent upon the operating point and any disturbance variables that may occur.

Therefore, the invention implements a combination of the use of two different operating methods for operating the energy converter or the energy converter system, as a result of which the advantages of both operating modes can be combined and hence new possible applications and modes of operation can be achieved. At the same time, it is possible to achieve an inexpensive system consisting of an energy converter, output filter with a high efficiency factor and, if required, also highly dynamic and robust regulation.

The invention thereby enables supply-network-side disturbances to be navigated without significant overcurrent problems, in particular if the energy converter provides a supply-network inverter with a functionality that can be impaired by supply-network disturbances. The supply-network disturbances can, for example, be caused by sudden changes in the supply-network voltage, supply-network impedances or the like. In the event of such disturbances, regulation based on the first operating mode may, for example, become unstable or provide insufficient dynamics so that consequential problems could occur.

In addition, the invention allows a network inverter also to be used as a robust energy producer and as an uninterrupted isolated supply-network former in the event of a supply-network outage. Although operation in the second operating mode allows high robustness, it can also act as a current source at the same time and therefore tends to be disadvantageous with an isolated supply-network operation. With an isolated supply-network operation, it is advantageous if the energy converter can be operated as voltage source and therefore the first operating mode would be preferable here. It would only be possible to regulate or apply the second operating mode here with a relatively high degree of measuring effort and computing effort.

The invention advantageously also enables so-called staging of energy converters, in particular inverters. This means that activation or deactivation of individual energy converters or inverters during operation as intended is possible in the case of the parallel connection of energy converters or inverters. Hence, the number of activated energy converters inverters can be adapted to the power required at present and thus an optimized degree of efficiency can be provided and the service life of the energy converter system or inverter system formed thereby can be increased. At the same time, the invention enables unfavorable transition processes, due, for example, to different switching actions between the individual energy converters or inverters to be avoided without expensive galvanic isolation of the individual energy converters or the individual inverters, for example by means of isolating transformers, on the activation or deactivation of a single energy converter or inverter. Here, operation in the second operating mode can achieve very fast current regulation so that the transition processes can also be reliably managed during operation as intended.

The control unit is further embodied to change between the first and the second operating mode during operation as intended of the energy converter. For this purpose, an algorithm can be provided for status monitoring and for mode changing with which it is possible to switch or change between operating modes at any time. This enables automated adaptation of the energy converter or the energy converter system to the respective conditions to be achieved. For this purpose, supply voltages can be detected and evaluated at the first and/or second connector and supply currents can be detected and evaluated at the first and/or second connector. The change can be dependent on one or more conditions, for example, with staging, on the activation and/or deactivation of one or more inverters of an inverter system, on the occurrence of a supply-network-side disturbance during the operation of a single inverter or also an inverter system, on switching losses and/or the like. It is also possible for one or more parameters, for example currents or the like, to be monitored and a change to be effected in dependence on a respective detected value in the comparison with a corresponding comparison value.

The first supply network is preferably embodied as a DC link and the supply-network current is that of the second supply network. This enables the energy converter to be adapted for a plurality of energy conversion functions used in the field of technology. For this purpose, the energy converter can in particular be a DC voltage converter or a DC/DC converter or also an inverter or the like. As an inverter, it can be used to provide a single-phase or also a polyphase AC voltage at the second connector. As a DC/DC converter, it can provide a DC voltage at the second connector.

It is further proposed that the control unit is embodied to effect a change from the first operating mode to the second operating mode in an unsynchronized manner. Herein, this development exploits the fact that the high dynamics of the second operating mode enable switching or changing from the first operating mode to the second operating mode to take place safely during operation as intended of the energy converter. Basically, no further operating conditions need to be taken into account. The control unit can decide on the basis of the detected boundary conditions that it is advisable to change from the first operating mode to the second operating mode and do this almost immediately or at a desired time point.

It is further proposed that the control unit is embodied to effect a change from the second operating mode to the first operating mode in dependence on a clock state of the PWM method. This reverse change from the second operating mode to the first operating mode can also be effected during operation as intended. However, here account should preferably be taken of the fact that the start of the clock state of the PWM method is calculated or possibly also delayed until, for example, the ripple current is as low as possible during operation according to the second operating mode. In particular, this can achieve an almost uninterrupted change of mode without a pulse lock. If the energy converter is an inverter for an electrical machine in motor operation, this may enable an almost continuous torque profile to be achieved. On the other hand, if it is a supply-network inverter, this may achieve no occurrence of significantly increased harmonics or other unfavorable supply-network perturbations. Or, these may at least be reduced.

It has been proven to be particularly advantageous for the control unit to be embodied to effect the change between the first operating mode and the second operating mode without interruption. This can achieve an almost continuous operation of the energy converter even during the change between the operating modes.

It is further proposed that the control unit comprises at least one integrator, wherein the control unit is further embodied such that the integrator adopts a predefinable integrator state in the second operating mode. This development exploits the knowledge that, in the first operating mode, the regulation uses at least one integrator, for example a digital integrator in order to reduce or avoid deviations, in particular permanent deviations. If the second operating mode is activated, this integrator should at least be paused. Another possibility is to set the integrator to zero or also to set it by continuously calculating integral components such that a corresponding output voltage results so that a supply-network current can be set such as is presently implemented with the second operating mode.

It is furthermore proposed that the supply-network current is detected in a discrete-time manner and a sampling rate is set in dependence on the respective operating mode. This development exploits the knowledge that the sampling rate for the supply-network current to be detected can be set in dependence on the respective operating mode. As a rule, it is sufficient for the first operating mode for a sampling rate in a range of, for example, 5 kHz to be selected. On the other hand, a higher sampling rate is to be recommended for the second operating mode, 100 kHz for example. If discrete-time regulation is used for the supply-network current, target voltages can be calculated, for example as a space vector with magnitude and angle, from which the PWM modulator can calculate the necessary switching actions for the respective subsequent PWM cycle.

In addition, it is proposed that the change from the second operating mode to the first operating mode takes place in dependence on a distortion component of the supply-network current and/or a power loss of the energy converter. In this way, it is possible to avoid an existing distortion component otherwise initially remaining as an offset and having to be corrected by a time-discrete current regulation, for example. This can, for example, be implemented in that initially corresponding suitable PWM pulse patterns are calculated and then the start of the output of the calculated PWM pulse pattern, and hence the change between the operating modes, is delayed, until a current error falls below a predefinable comparison value during operation in the second operating mode. Pulse patterns output in the second operating mode can be used to calculate the present supply voltage and use this as a starting value, for example as an integral component, of the discrete-time current regulation. The measures named can, for example, reduce transient responses with respect to the change in operating modes. However, they are not absolutely necessary.

Instead of a PWM modulator, it is, for example, also possible to be use a modulator with previously calculated, optimized pulse patterns. In this way, the switching actions for a defined time interval or a defined period of time in the future are preferably established in a present calculation cycle and the next intervention is only possible after this switching sequence has elapsed. In particular, the clock rate of the PWM pulse pattern can be changed after each switching period in order to achieve a wobble. In this way, for example, a disturbance power can be spectrally distributed over a plurality of frequencies so that, for example, it is possible to use more favorable output filters. As a result, a voltage-frequency spectrum of PWM modulation with wobble is similar to a voltage-frequency spectrum of a direct current regulation according to the second operating state.

It is to be expected that, after switching or changing between the operating modes, transient responses, manifested in different degrees of severity, will occur. These transient responses can be reduced after a switchover or a change between operating modes by a suitable selection of a switchover time or a changing time and suitable defaults with respect to the respective regulations, in particular integral components. However, transition from PWM modulation to direct current regulation does not need any special requirements to be placed on the switchover time or the changing time because, due to the high dynamics of the direct current regulation, residual current distortion components can be corrected without problems during the change within a PWM clock interval. The resulting ripple current can be detected during the first operating state and, on a change to direct current regulation according to the second operating state, used as a starting value for switching hysteresis, which can be formed by at least one of the switching values, for regulation of the switching frequency. Depending upon the structure it may be necessary to convert the values detected in the first operating mode.

On the other hand, if possible, the switchover or the change from the second operating mode to the first operating mode should take place at a time at which any distortion component in the supply-network current is as low as possible because an existing distortion component would otherwise initially remain as an offset and would have to be corrected by discrete-time current regulation.

It is preferably further provided that the first and/or the second relative switching value is selected in dependence on the predefinable comparison current. This enables the provision of hysteresis within which the ripple current is in the second operating mode. One of the switching values can also be formed by the comparison current. Further, the first switching value can be greater than the predefined comparison current while the second switching value can be lower than the predefined comparison current. Particularly advantageously, the first and the second switching value are selected with the same distance to the comparison current. This enables a hysteresis window to be achieved symmetrically to the predefined comparison current.

It is further proposed that there is an automatic change to the second operating mode if a disturbance is determined in the first and/or second electrical supply network. If a disturbance occurs in a respective one of the supply networks, a fast regulating functionality with high dynamics may be desirable such as can be implemented by the second operating mode. This can further improve the reliability of the operation of the energy converter. The disturbance in one of electrical supply networks can, for example, take place by means of measuring the voltage and/or current at the first or second connector of the energy converter.

It is further proposed that, to provide an isolated network functionality of the energy converter, the setting of the supply-network current is deactivated in dependence on the comparison current and the energy converter is operated in the first operating mode in order to provide a predefined electrical supply voltage at the corresponding connector. The functionality as a current source is preferably deactivated in this operating state and a predefined comparison voltage can be used to set the supply voltage. A regulating functionality can also be provided with respect to the setting of the supply voltage. As a result, the isolated supply-network operation can be activated automatically in a simple manner in the event of a supply-network outage so that an energy-supply functionality can be provided almost continuously.

It is furthermore proposed that, to activate or deactivate one of the at least two energy converters of the energy converter system during operation as intended of the energy converter system, at least for a predefined period of time, at the most one of the energy converters is operated in the first operating mode and the rest of the energy converters are operated in the second operating mode. Of course, it is also possible for all the energy converters to be operated in the second operating mode. Such a method is also called staging. This can enable the reduction, if not complete suppression, of transient processes that occur during the activation or deactivation due to the high dynamics of the regulation in the second operating mode. This can in particular enable galvanic isolation of the energy converter, for example on an AC voltage side, to be dispensed with. This can reduce costs and weight.

The advantages and effects disclosed for the energy converter according to the invention of course apply equally to the energy converter system according to the invention and to the method according to the invention and vice versa. In particular, therefore, method features can also be formulated for apparatus features and vice versa.

BRIEF DESCRIPTION OF THE DRAWING

Further advantages and features may be derived with reference to the following description of exemplary embodiments with reference to the attached figures. In the figures, the same reference characters designate the same features and functions.

The figures show.

DETAILED DESCRIPTION OF PREFERRED EMBODIMENTS

Figure 1:
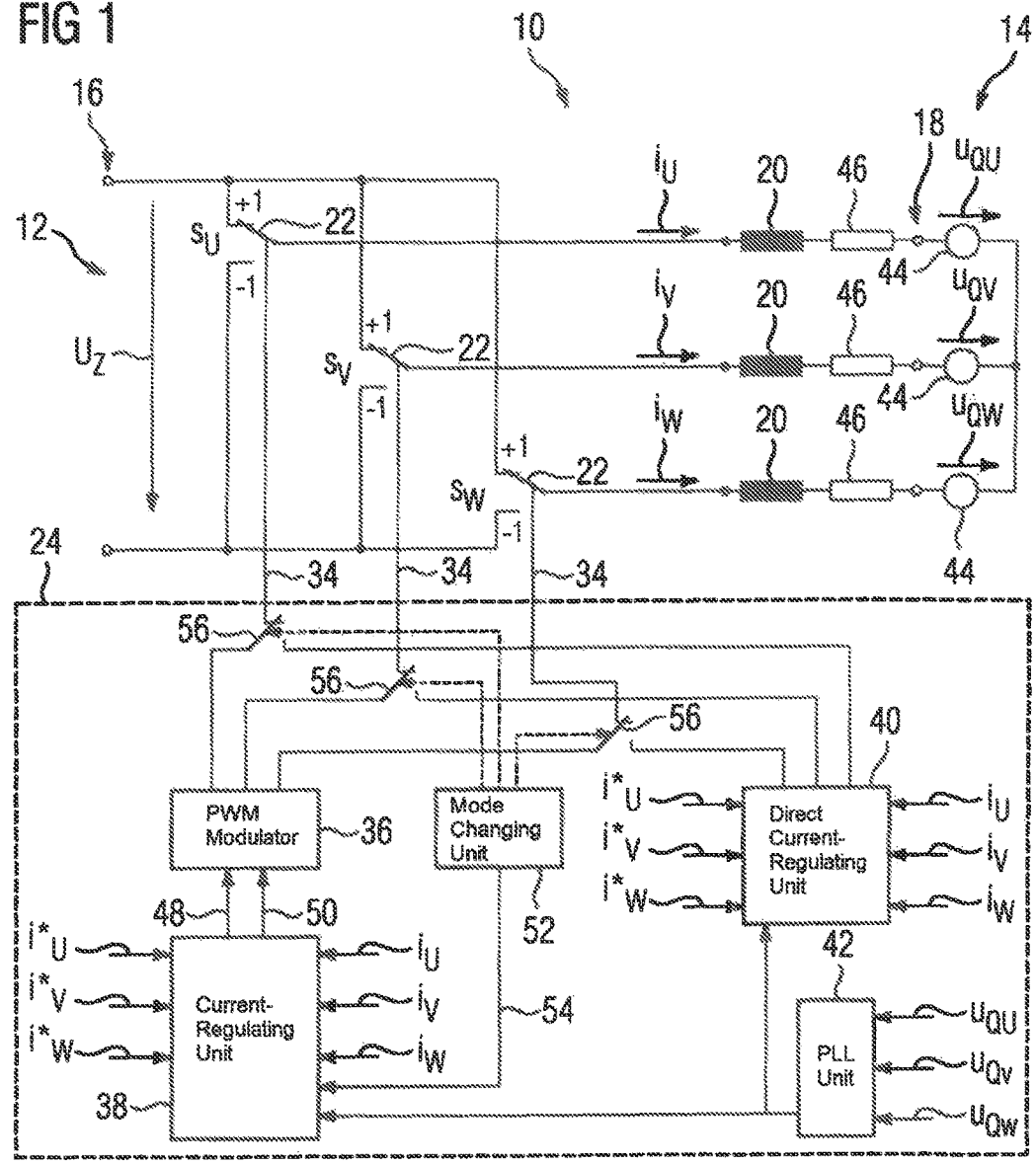
FIG. 1 a schematic circuit diagram depiction of an inverter as an energy converter according to the invention embodied to electrically couple a DC-link voltage as a first electrical supply network to a three-phase AC voltage as a second electrical supply network.

FIG. 1 is a schematic circuit diagram depiction of a three-phase inverter 10 as an energy converter by means of which a DC link 12 as a first electrical supply network is electrically coupled to a three-phase AC voltage supply network 14 as a second electrical supply network. For this purpose, the energy converter 10 comprises a first connector 16 to be connected to the DC link 12 and a second connector 18 to be connected to the three-phase AC voltage supply network 14.

A respective converter inductor 20 and a switch element 22 electrically coupled to the respective converter inductor 20 is provided for each phase of the three-phase AC voltage supply network 14, wherein the first connector 16 electrically couples a respective, not further designated, phase connector of the second connector 18 via the respective combination of the respective converter inductor 20 to the respective assigned one of the switch elements 22.

The inverter 10 further includes a control unit 24, which is electrically coupled via respective control lines 34 to a respective one of the switch elements 22 so that the switch elements 22 can be individually supplied by means of control signals. The control unit 24 is embodied to operate the switch elements 22 in a switching operation such that the inverter 10 provides a predefinable energy conversion functionality between the first and the second connector 16, 18. It is provided in the present embodiment that a regulated alternating current as a type of current source is provided for each phase of the AC voltage supply network 14 at the second connector 18. For this purpose, the control unit 24 is embodied to set a respective supply-network current of a respective phase at the second connector 18 in dependence on a comparison with a predefinabe comparison current. Therefore, the control unit 24 provides a corresponding current regulation.

Figure 4:
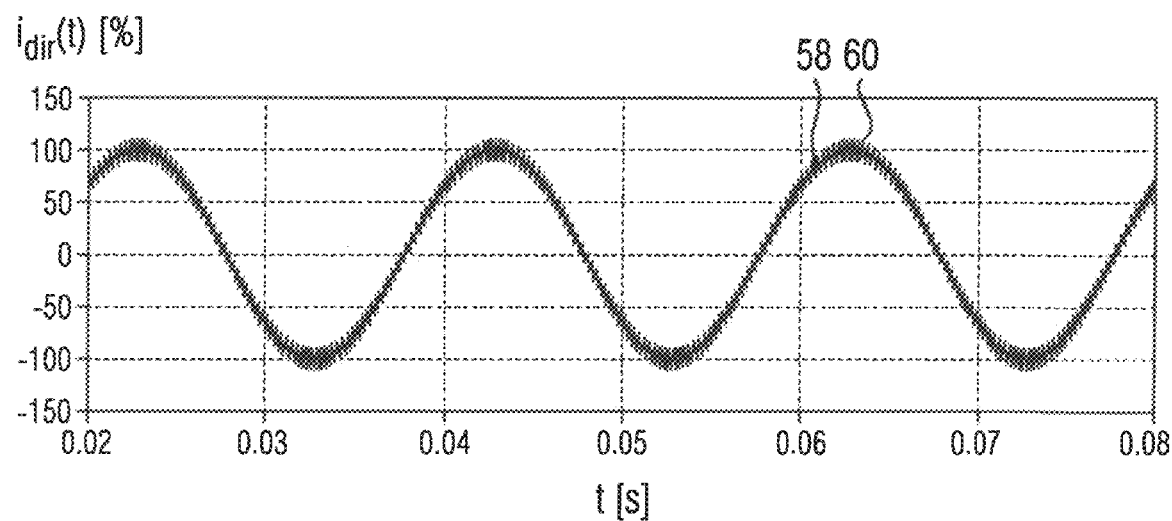
FIG. 4 a schematic diagram depiction for a supply-network current at the AC voltage side connector of the inverter according to FIG. 1 for a single phase in a second operating mode.
Figure 6:
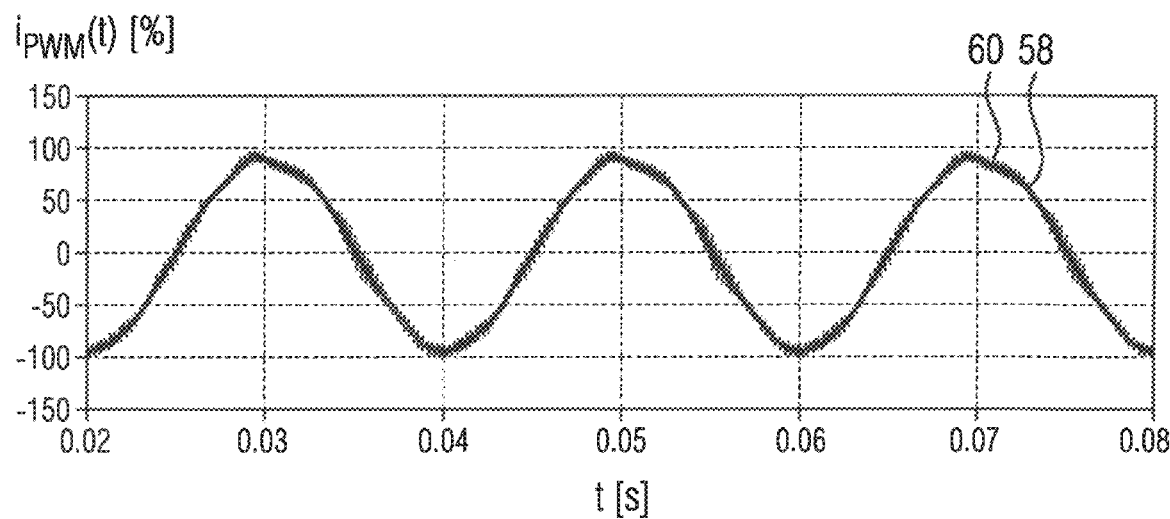
FIG. 6 a schematic diagram depiction as in FIG. 4 for the supply-network current of the inverter according to FIG. 1, but here in a first operating mode of the inverter and FIG. 7 a schematic diagram depiction as in FIG. 5 but for the first operating mode according to FIG. 6.

In the present case, the comparison current is defined separately for each phase by a target alternating current. The control unit 24 now controls the switch elements 22 in switching operation such that the action of the converter inductors 20 enables the target comparison current to be approximated as closely as possible. Herein, it should be noted, that, due to the clocked operation of the switch elements 22, a current profile is achieved which is superimposed by a corresponding ripple current caused by the switching operation of the switch elements 22 (FIG. 4, FIG. 6).

In the present case, the control unit 24 is embodied to provide the switching operation in two different operating modes. In a first operating mode, it is provided for the switching operation, that the electrical supply voltage is provided at the connector 18 for a respective phase of the AC voltage supply network 14 by means of a PWM method in dependence on the comparison. For this purpose, with respect to the AC voltage supply network 14, voltage sensors 44 are provided by means of which a respective phase of the three-phase AC voltage of the AC voltage supply network 14 can be detected. The corresponding measured values are supplied via lines, not depicted, to a phase-locked loop (PLL) unit 42. This generates signals with respect to respective phase angles and the frequency of the three-phase AC voltage of the AC voltage supply network 14 for the further units of the control unit 24. These signals are supplied to a current-regulating unit 38 for discrete-time current regulation.

Further, the current-regulating unit 38 receives respective phase currents or supply-network currents, namely $i_u$, $i_v$, $i_w$, at the second connector 18 by means of current sensors 46. Further, the current-regulating unit 38 is supplied with target values for the respective phase currents $i^*_u$, $i^*_v$, $i^*_w$. From these, the current-regulating unit 38 determines values for a present target voltage and a present target angle, which are supplied to a PWM modulator 36 of the control unit 24 via respective communication lines 48, 50. The PWM modulator 36 generates the corresponding control signals, which are supplied via the control lines 34 to the respective one of the switch elements 22 so that they can be operated in clocked operation as intended.

Therefore, the first operating mode provides indirect current regulation with which a corresponding current flow is to be produced by setting the respective electrical voltage at the second connector 18.

As is evident from FIG. 1, the signal lines 34 are not directly connected to the PWM modulator 36, instead they are routed via electronic changeover switches 56. The electronic changeover switches 56 allow the control signals to be supplied to the switch elements 22 in dependence on the operating state selected in each case. In the switching position depicted in FIG. 1, the operating mode is activated so that the switch elements 22 are operated according to a PWM method in switching operation.

FIG. 1 further shows that the control unit includes a direct current-regulating unit 40. In addition to the information with respect to the phase angle and the frequency of the PLL unit 42, the direct current-regulating unit 40 also receives as input signals the detected phase currents $i_u$, $i_v$, $i_w$, which were detected by means of the current sensors 46, and the corresponding target currents $i^*_u$, $i^*_v$, $i^*_w$, which are also available to the current-regulating unit 38. The direct current-regulating unit 40 further includes—not depicted in FIG. 1—a first predefinable relative switching value, which is defined for each of the phase currents $i_u$, $i_v$, $i_w$ and a corresponding second predefinable relative switching value.

At any point in time, the first switching value is greater than the corresponding target current $i^*_u$, $i^*_v$, $i^*_w$ by a predefinable offset magnitude, while the second switching value is correspondingly lower in each case. In the present case, magnitudes of the corresponding switching values are selected as the same. However, in alternative embodiments, they can also be selected as different from one another. The switching values provide a hysteresis range around the respective one of the current target values $i^*_u$, $i^*_v$, $i^*_w$ which is used to trigger a respective switching action and to output corresponding control signals for the switch elements 22. For this purpose, individual control signals are routed to the electronic changeover switches 56 for each of the switch elements 22. If the electronic changeover switches 56 are switched over to the respective other switching position, there is a so-called direct current regulation according to the second operating mode of the control unit 24.

The electronic changeover switches 56 are connected to a mode changing unit 52 for the purposes of switching over. The mode changing unit 52 can be used to switch over the operating modes accordingly in dependence on status monitoring. To enable an almost disturbance-free switchover also to be achieved in operation as intended of the inverter 10 if possible, all units of the control unit 24 are kept active independently of the respective activated operating state. This makes it possible to change between the operating states almost at will.

Since the current-regulating unit 38 includes an integrator, not shown, and, to change over from the second operating state into the first operating state, it is expedient for the integrator not to have an arbitrary starting value, the mode changing unit 52 can apply a predefined starting value to the integrator of the current-regulating unit 38 via a line 54. This can achieve improved changing with respect to the two different operating modes during operation as intended of the inverter 10.

Figure 5:
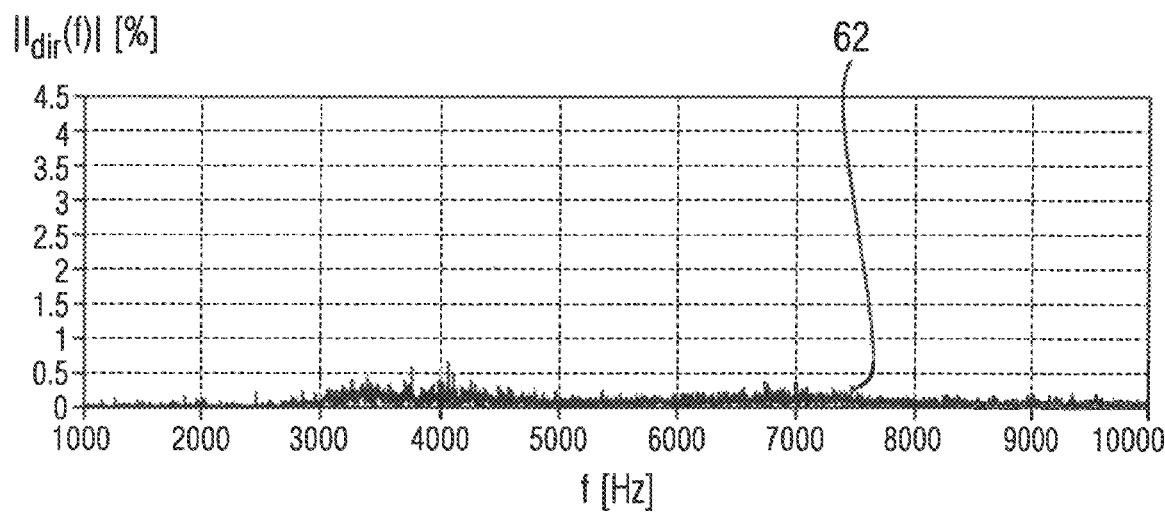
FIG. 5 a schematic diagram depiction of a spectral energy distribution for supply-network current according to FIG. 4.

FIGS. 4 to 7 show impacts of the first and the second operating mode. FIGS. 4 and 5 relate to the second operating mode, while FIGS. 6 and 7 relate to the first operating mode. In FIGS. 4 and 6, the abscissa is in each case assigned to the time while in FIGS. 5 and 7, the abscissa is in each case assigned to the frequency. In FIGS. 4 to 7, the ordinate is in each case assigned to the relative supply-network current of a phase at the connector 18.

As a representative example, FIG. 4 shows a target current profile for one of the phases at the second connector 18 by means of a graph 58. An actual current, as detected by means of the respective one of the current sensors 46, is depicted by means of a graph 60. It may be identified that the first and the second switching value provide a hysteresis band symmetrically with respect to the graph 58 within which the actual current of the respective phase at the connector 18 fluctuates. Therefore, a corresponding ripple current is superimposed. FIG. 5 shows by means of a graph 62 a relative spectral distribution of the current profile according to FIG. 4 as depicted by means of the graph 60. It may be identified that there is a very broad spectral distribution.

FIG. 6 shows in a depiction as in FIG. 4 how the current profile according to the graph 60 changes if now the first operating mode is activated instead of the second operating mode. In the depiction according to FIG. 6, it should be noted that the size ratios of the ripple current are not precisely met. In fact, the ripple current obtained in the graph 60 in FIG. 6 is considerably greater than the ripple current as is depicted by means of the graph 60 in FIG. 4.

Figure 7:
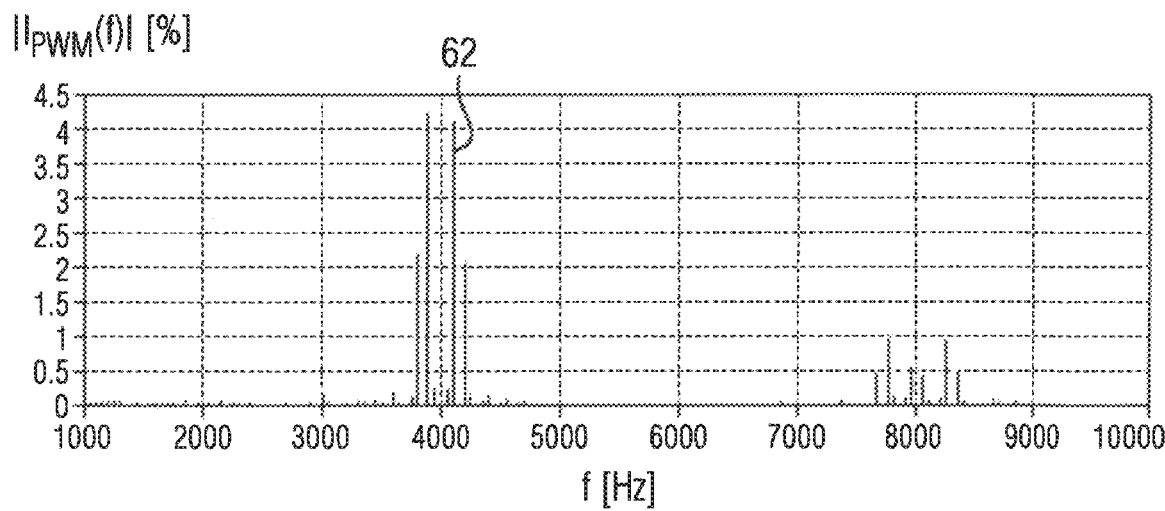

FIG. 7 shows the corresponding relative spectral distribution in the first operating mode according to FIG. 6. It may be identified that the spectral energy is substantially concentrated on two peaks. Unlike the second operating mode, in which, as is evident from FIG. 5, the spectral energy has a broad distribution, here the energy has a narrowband distribution in the first operating mode. It is distributed on the two peaks to a large extent.

The following is now intended to explain the operation of the inverter 10 in more detail. The following initially considers a case in which a self-commutated supply-network, which, in the present case, is embodied as an inverter 10, is operated in normal operation in the first operating mode, namely in a switching operation in accordance with a PWM method. Herein, the aim in the present embodiment is to achieve the lowest possible overall distortion of voltage at the second connector 18 and the highest possible degree of efficiency.

On the occurrence of a disturbance in the supply network, for example a symmetrical and an asymmetrical voltage change, a phase jump, a frequency change, a change to the supply-network impedance, a phase failure or the like, the dynamics in the first operating mode may be insufficient to continue to regulate the supply-network current as intended. Therefore, this can result in strong deviations from the target value or even overcurrent or overvoltage protection shutdowns. Moreover, as a rule defined dynamics of a controlled system are assumed for configuration and parameterization of the PWM method. If the supply-network changes cause the actual controlled system to deviate too greatly therefrom, the regulation can become unstable. Once again, this results in overcurrent/overvoltage protection shutdowns and impermissible harmonics of currents and voltages.

Therefore, in order to avoid the aforenamed problems, the inverter 10 can be operated as follows. The mode changing unit 52 can identify a corresponding operating situation due, for example, to a high system deviation, arrival at a current or voltage threshold, an external signal or the like. If a problematic operating situation of this kind is identified, the mode changing unit 52 initiates a change of mode from the first operating mode to the highly dynamic second operating mode. Once the problematic operating situation has been overcome, for example in that values of currents and voltages and frequencies are again within regular limits over a predefinable time, it is possible to change back from the second operating mode to the first operating mode. Since the second operating mode is less favorable with respect to efficiency, it is also possible to define a maximum permissible operating period for the second operating mode. When the maximum predefined operating period has been reached, an automatic change from the second operating mode to the first operating mode can be provided.

The following operating situation considers a case in which, in normal operation, the supply-network inverter, which is formed by the inverter 10, works with direct current regulation in the second operating mode because a robust highly dynamic operating situation with fluctuating supply-network parameters is in the foreground. This can, for example, be the case with energy generation or an energy store. In addition, there is also requirement for the ability to provide an isolated supply network with almost no interruption in the event of a supply-network disturbance so that the energy supply can continue to be ensured.

In the event of isolated supply network operation, the inverter 10 is tasked with regulating the voltage and the frequency in the supply network. Active and reactive variables are to a large extent determined by the consumers connected to the isolated supply network and are hence initially unknown to the inverter 10 and can vary greatly over time. Hence, it may be difficult to define a comparison current for direct current regulation in the first operating mode for all conceivable operating situations and load changes and this may require a large amount of measuring and computing effort. On the other hand, in this operating situation, voltage regulation at the second connector 18 in the first operating state would form a direct regulation for the supply voltage so that the current-regulating unit 38 can be deactivated. Corresponding target values for the supply voltage, which are required for the PWM modulator 36, can then be provided directly from a higher-level regulation for the supply voltage and the frequency.

Therefore, it is proposed in this situation that there should be a change from the second operating mode to the first operating mode with an uninterrupted change and the current-regulating unit 38 is deactivated accordingly. A return to the current-regulating operating mode can take place when voltage source operation is no longer required for the provision of the isolated supply network. This can, for example, be the case when a different type of energy generation takes over the formation of the supply network and its separate inverter 10 can be used again to regulate DC-link voltage and supply its load. Or, it would also be possible for an external electrical supply network to be available again so that the isolated supply network is initially synchronized with the external electrical supply network and then electrically coupled thereto, whereupon the inverter 10 can then be changed to current-regulating operation without interruption, in particular to the second operating mode.

In another typical application for this, the inverter 10 is coupled to an electrical energy store, such as a battery or the like at the first connector 16, which, for charging and discharging, receives active and reactive current target values from a higher-level control and, in the event of an outage of the external electrical supply network, provides an isolated supply network without interruption.

Figure 2:
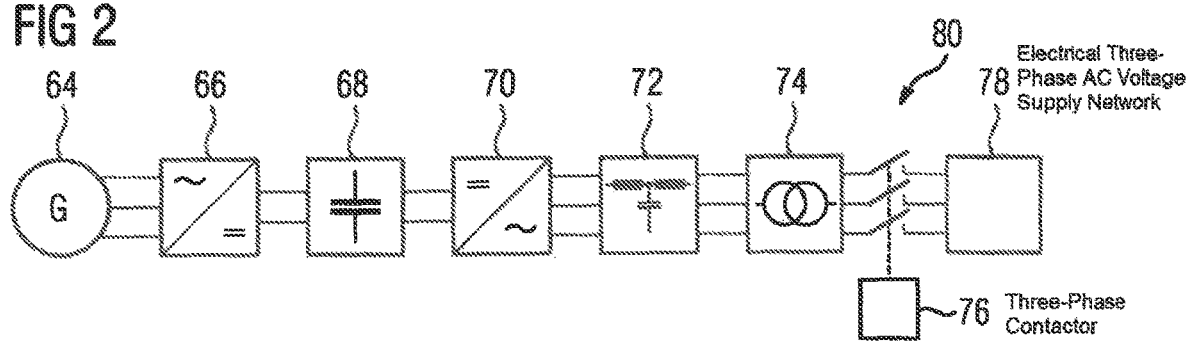
FIG. 2 a schematic block diagram depiction for an electric drive device with an inverter according to FIG. 1.

FIG. 2 depicts a schematic block diagram of a drive train 80. The drive train 80 comprises an electrical machine 64 configured for three-phase operation. The electrical machine 64 is connected to an energy converter 66, which is in turn connected to a DC link 68. Also connected to the DC link 68 is a further energy converter 70, which provides a further three-phase AC voltage supply network, which is connected to a current regulator 74 via a filter unit 72. The current regulator 74 is connected via a three-phase contactor 76 to an electrical three-phase AC voltage supply network 78, which is not further specified.

In this embodiment, the energy converter 66 and/or the energy converter 70 can be formed by an inverter 10 according to FIG. 1. The drive train 80 can, for example, be used to provide a mechanical propulsion power in a production line. In addition, the drive train 80 can also be used to supply electrical energy from the electrical machine 64 to the electrical AC voltage supply network 78. Such a case can, for example, occur when the electrical machine 64 is arranged in a wind turbine or the like.

Figure 3A:
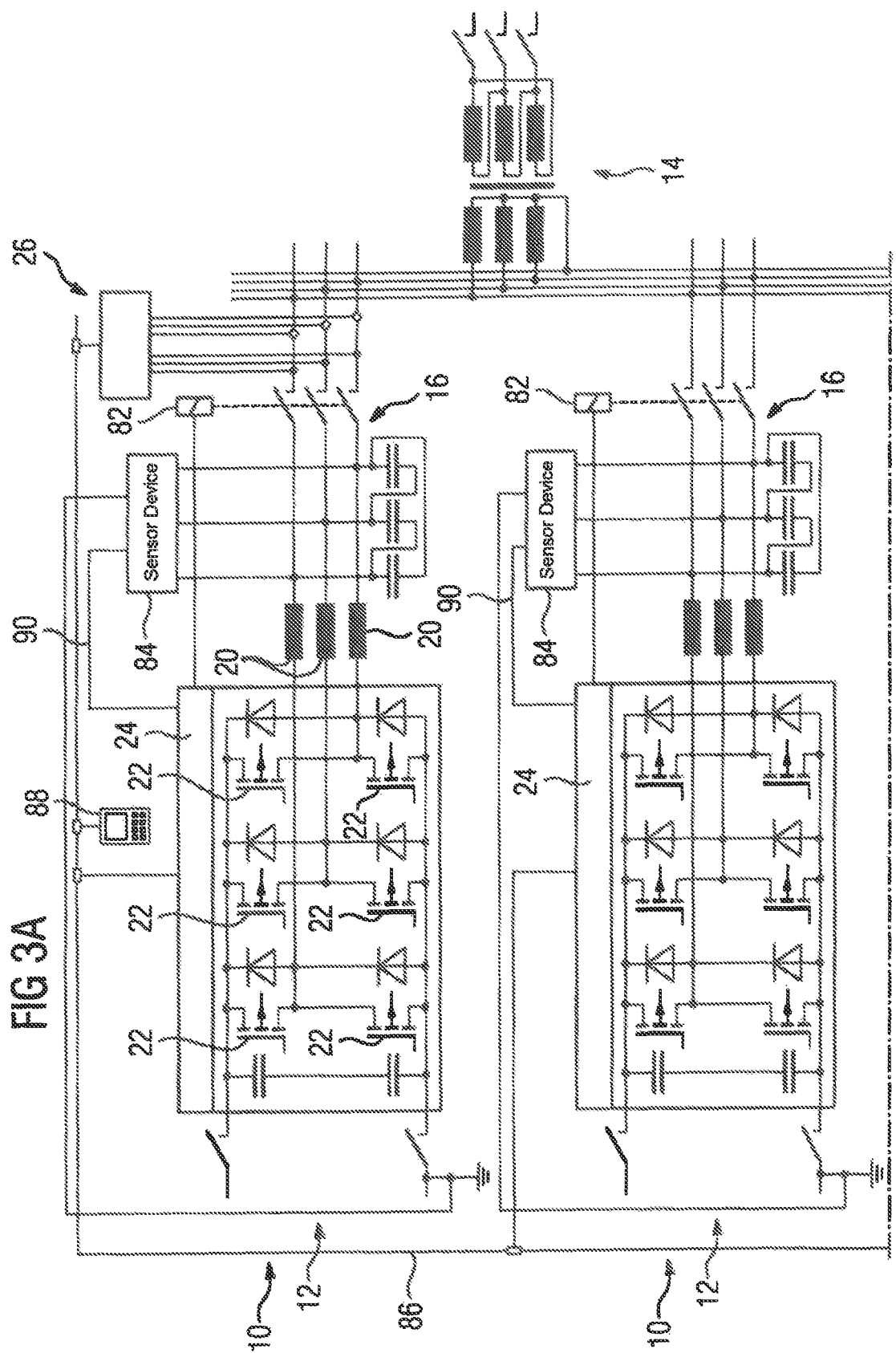
FIGS. 3A, 3B a schematic circuit diagram depiction of an energy converter system with four inverters connected in parallel according to FIG. 1 which electrically couple a DC-link voltage as a first electrical supply network to a three-phase AC voltage as a second electrical supply network.
Figure 3B:
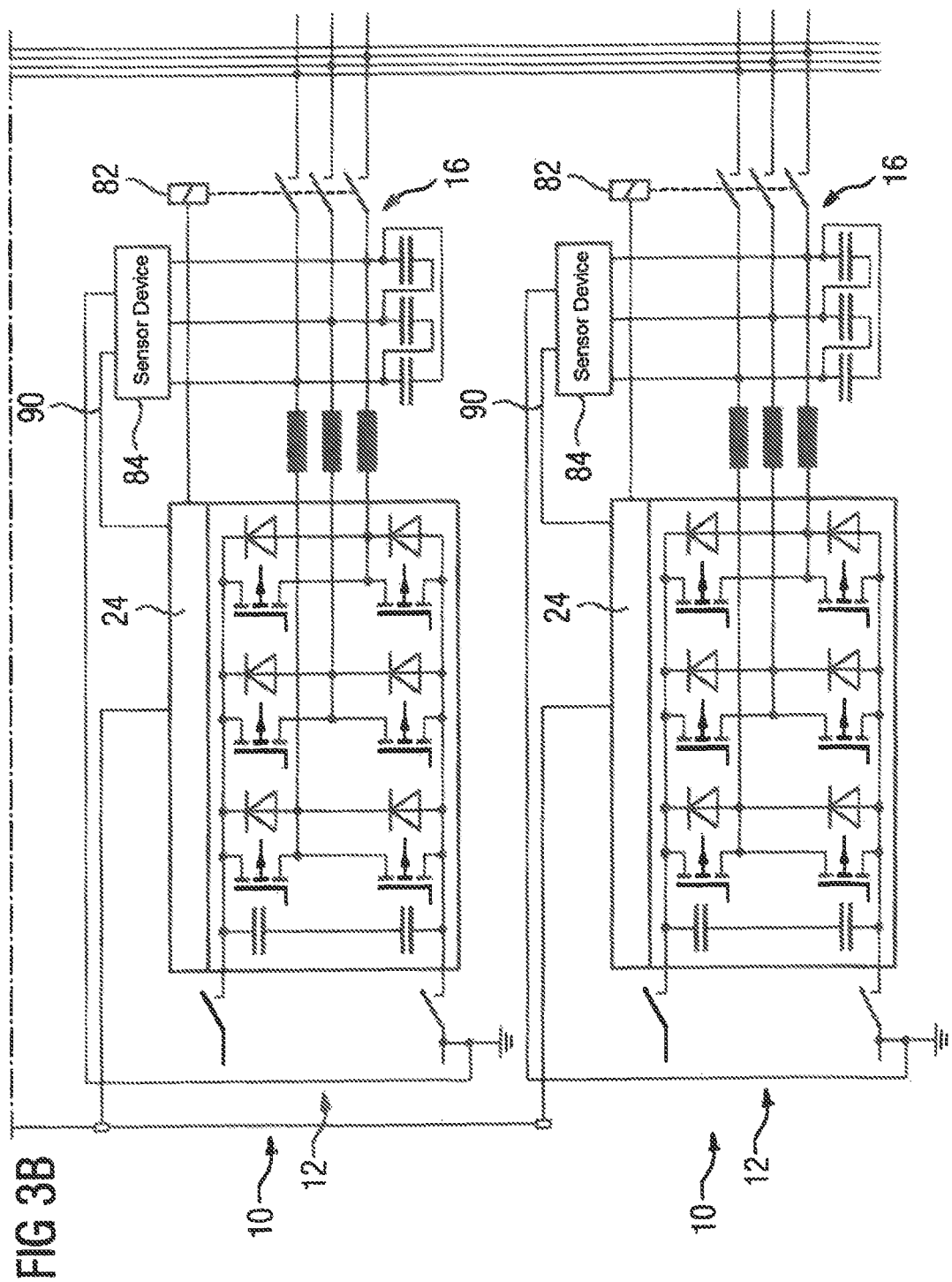

FIGS. 3A, 3B show an energy converter system 26 with four inverters 10 connected in parallel such as have already been explained with reference to FIG. 1. The respective first connectors 16 are jointly connected in parallel to a DC link 12. Accordingly, the respective second connectors of the inverters 10 are connected in parallel to a three-phase AC voltage supply network 14. In the present case, the switch elements 22 in the inverters 10 are formed by half-bridge circuits of field-effect transistors, namely insulated gate bipolar transistors (IBGT) in the present case. The function of such half-bridge circuits has already been extensively discussed in the prior art and therefore there will be no detailed explanation with respect to energy conversion in the present case.

The respective second connectors 18 of the inverters 10 are electrically coupled to the three-phase AC voltage supply network 14 via a respective three-phase contactor 82. This enables the inverters 10 to be optionally separated from the AC voltage supply network 14. It may further be identified that the control units 24 are coupled in terms of communication technology to a control panel 88 via a BUS system 86. In the present case, the BUS system 86 is formed by a PROFIBUS as a field bus.

Further respective sensor devices 84 are connected to the respective second connectors 18, which are connected via a respective line 90 to the respective control unit 24. The corresponding sensor signals are transmitted to the control unit 24 via the line 90. The control unit 24 determines respective phase voltages and phase currents on the respective one of the second connectors 18.

The following considers a case in which, in normal operation, the energy converter system 26 is operated such that its inverters 10 are operated in the first operating mode in order to be able to achieve the lowest possible overall distortion of the voltage at the respective connectors 18 and the highest possible degree of efficiency with parallel connection of the inverters 10.

The energy converter system 26 is embodied to implement so-called staging. Herein, in order to be able to adapt a maximum power to an instantaneous actual power requirement, inverters 10 that are not required can be switched off by means of the contactor 82. This can significantly improve the degree of efficiency of the energy converter system 26 at partial power and increase the service life because the operating hours for the individual inverters 10 can be reduced.

To switch a single one of the inverters 10 on or off, this inverter must be able to carry other currents than the other activated inverters 10 for a short transition period during the provision of the current or the reduction of current to zero, namely while the contactor 82 is still in switched-on switching state. This requires different switching patterns or output voltages of the individual inverters 10 to be enabled which can in turn cause high circulating currents that cannot really be controlled by the first operating mode. In the prior art, it is customary at this point to use high-cost isolating transformers to prevent such circulating currents.

The invention can enable the high-cost isolating transformers to be dispensed with. As a result, staging can be used not only for a few special applications but for a much broader field of use, in particular with standard applications with respect to the use of the advantages relating to part-load operation.

To enable an individual inverter 10 to be switched on or off, it is proposed in the present case that all the inverters 10 be operated in the second operating mode, i.e. that there is a change from the first operating mode to the second operating mode. The high dynamics of the direct current regulation of the second operating mode enable parallel operation with unsynchronized switching commands relating to the switch elements 22. In particular, it can be achieved that current comparison values for the inverters 10 to be switched off are brought to zero with a ramp function. Only then does the contactor 82 open. After an opening time has elapsed, for example evaluation of a feedback signal or the like, the inverters 10 that are still active can change back to the first operating mode again.

To switch on a single one of the inverters 10, initially the inverters 10 that are already activated are transferred to the second operating mode. The same also applies to the inverter 10 to be connected. The contactor 82 in question is closed and the current of the additional inverter can now be brought to the comparison currents of the inverters 10 that are already active by means of a ramp function. Herein, it should be noted that their comparison currents are of course reduced accordingly so that the predefinable total current value can be achieved. As soon as all active inverters 10 receive the same comparison currents, it is possible to change back to the respective first operating mode.

It should be noted that, in particular in continuous operation with inverters 10 connected in parallel, the second operating mode may require specially adapted supply-network filters. Otherwise, considerable additional component loads and losses may occur. For this purpose, it is proposed that a respective period of time be defined for switching individual inverters 10 on or off, for example 50 ms to approximately 500 ms. The respective switching on or switching off can then be carried out within this period. This can reduce the resulting unfavorable effects so that it is possible to reduce adaptations to supply-network filters to a large extent. This in particular also relates to common-mode inductance in the supply-network and active damping with fast voltage measurement in the supply-network filter.

The description of the exemplary embodiments serves exclusively to explain the invention and is not intended to restrict the invention. Features of the description can of course be combined with one another in almost any way.

What is claimed is:

1. An energy converter for electrically coupling a first electrical supply network to a second electrical supply network, said energy converter comprising:
a switch element; and
a control unit electrically coupled to the switch element and configured to operate the switch element in a switching operation such that the energy converter provides a predefinable energy conversion functionality, said control unit configured to set a supply-network current for one of the first and second electrical supply networks in dependence on a comparison of the supply-network current with a predefinable comparison current, said control unit configured
to provide a first operating mode for the switching operation for setting an electrical voltage at the one of the first and second supply networks using a PWM method in dependence on the comparison,
to provide a second operating mode for the switching operation in which the switch element is switched when, during the comparison, a difference between the supply-network current and the predefinable comparison current is greater than a first predefinable relative switching value and/or smaller than a second predefinable relative switching value, and
during operation of the energy converter, to change between the first operating mode and the second operating mode such that in the event of a supply-network disturbance, a change is effected from the first operating mode to the second operating mode and, when the supply-network disturbance has been overcome, a change is effected back from the second operating mode into the first operating mode.

2. The energy converter of claim 1, wherein the first supply network is embodied as a DC link and wherein the supply-network current is that of the second supply network.

3. The energy converter of claim 1, wherein the control unit is configured to effect the change from the first operating mode to the second operating mode in an unsynchronized manner.

4. The energy converter of claim 1, wherein the control unit is configured to effect the change from the second operating mode to the first operating mode in dependence on a clocked state of the PWM method.

5. The energy converter of claim 1, wherein the control unit is configured to effect the change between the first operating mode and the second operating mode without interruption.

6. The energy converter of claim 1, wherein the control unit comprises an integrator configured to adopt a predefinable integrator state in the second operating mode.

7. An energy converter system for electrically coupling a first electrical supply network to a second electrical supply network, said energy converter system comprising at least two energy converters connectable to the first electrical supply network and to the second electrical supply network, each said energy converter comprising a switch element, and a control unit electrically coupled to the switch element and configured to operate the switch element in a switching operation such that the energy converter provides a predefinable energy conversion functionality, said control unit configured to set a supply-network current for one of the first and second electrical supply networks in dependence on a comparison of the supply-network current with a predefinable comparison current, said control unit configured
to provide a first operating mode for the switching operation for setting an electrical voltage at the one of the first and second supply networks using a PWM method in dependence on the comparison,
to provide a second operating mode for the switching operation in which the switch element is switched when, during the comparison, a difference between the supply-network current and the predefinable comparison current is greater than a first predefinable relative switching value and/or smaller than a second predefinable relative switching value, and
during operation of the energy converter, to change between the first operating mode and the second operating mode such that on the occurrence of a supply-network disturbance, a change is effected from the first operating mode to the second operating mode and, when the supply-network disturbance has been overcome, a change is effected back from the second operating mode into the first operating mode.

8. The energy converter system of claim 7, wherein the first supply network is embodied as a DC link and wherein the supply-network current is that of the second supply network.

9. The energy converter system of claim 7, wherein the control unit is configured to effect the change from the first operating mode to the second operating mode in an unsynchronized manner.

10. The energy converter system of claim 7, wherein the control unit is configured to effect the change from the second operating mode to the first operating mode in dependence on a clocked state of the PWM method.

11. The energy converter system of claim 7, wherein the control unit is configured to effect the change between the first operating mode and the second operating mode without interruption.

12. The energy converter system of claim 7, wherein the control unit comprises an integrator configured to adopt a predefinable integrator state in the second operating mode.

13. A method for operating an energy converter, which electrically couples a first electrical supply network to a second electrical supply network by converting electrical energy via a switch element, said method comprising:
operating the switch element in a switching operation such that the energy converter provides a predefined energy conversion functionality; and
setting a supply-network current for one of the first and second supply networks in dependence on a comparison of the supply-network current with a predefined comparison current,
wherein a first operating mode for the switching operation is provided in which an electrical voltage is set on the one of the first and second supply networks using a PWM method in dependence on the comparison,
wherein a second operating mode is provided in which the switch element is switched when, during the comparison, a difference between the supply-network current and the predefined comparison current is greater than a first predefined relative switching value and/or smaller than a second predefined relative switching value, and
wherein during operation as intended of the energy converter, there is a change between the first operating mode and the second operating mode such that, on the occurrence of a supply-network disturbance, a change is effected from the first operating mode to the second operating mode and, when the supply-network disturbance has been overcome, a change is effected back from the second operating mode into the first operating mode.

14. The method of claim 13, further comprising:
detecting the supply-network current in a discrete-time manner, and
setting a sampling rate in dependence on the respective one of the first and second operating modes.

15. The method of claim 13, wherein the change from the second operating mode to the first operating mode is effected in dependence on a distortion component of the supply-network current and/or a power loss of the energy converter.

16. The method of claim 13, further comprising selecting at least one of the first relative switching value and the second relative switching value in dependence on the predefined comparison current.

17. The method of claim 13, wherein the change to the second operating mode is effected automatically when a disturbance is determined in at least one of the first and second electrical supply networks.

18. The method of claim 13, further comprising:
deactivating the setting of the supply-network current in dependence on the comparison current to provide an isolated network functionality of the energy converter and
operating the energy converter in the first operating mode in order to provide a predefined electrical supply voltage at the corresponding one of the first and second supply networks.

19. A method for operating an energy converter system to electrically couple a first electrical supply network to a second electrical supply network via a plurality of energy converters which are connected to the first electrical supply network and to the second electrical supply network, said method comprising:
operating each of the plurality of energy converters by a method as set forth in claim 13.

20. The method of claim 19, wherein to activate or deactivate one of the at least two energy converters, at least for a predefined period of time, at the most one of the energy converters is operated in the first operating mode and any other one of the plurality of energy converters is operated in the second operating mode during operation of the energy converter system.

* * * * *